United States Patent
Lim et al.

(10) Patent No.: US 11,853,146 B2
(45) Date of Patent: Dec. 26, 2023

(54) VEHICLE AND CONTROL METHOD THEREOF

(71) Applicants: Hyundai Motor Company, Seoul (KR); Kia Motors Corporation, Seoul (KR)

(72) Inventors: Hongyeol Lim, Incheon (KR); Woo Cheol Kwon, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 719 days.

(21) Appl. No.: 16/923,756

(22) Filed: Jul. 8, 2020

(65) Prior Publication Data
US 2021/0146948 A1 May 20, 2021

(30) Foreign Application Priority Data
Nov. 15, 2019 (KR) .......... 10-2019-0146616

(51) Int. Cl.
*G06F 11/07* (2006.01)
*G07C 5/08* (2006.01)
*G06F 9/48* (2006.01)
*G06F 9/50* (2006.01)
*B60W 50/029* (2012.01)

(52) U.S. Cl.
CPC .......... *G06F 11/0739* (2013.01); *G06F 9/485* (2013.01); *G06F 11/0715* (2013.01); *G07C 5/0816* (2013.01); *B60W 50/029* (2013.01); *G06F 9/5038* (2013.01)

(58) Field of Classification Search
CPC .. G06F 11/0739; G06F 11/0715; G06F 9/485; G06F 9/5038
See application file for complete search history.

(56) References Cited

U.S. PATENT DOCUMENTS

| | | | | |
|---|---|---|---|---|
| 4,333,144 A | * | 6/1982 | Whiteside | G06F 9/4881 718/107 |
| 2017/0243463 A1 | * | 8/2017 | Rdzak | A61J 7/049 |

* cited by examiner

*Primary Examiner* — Nadeem Iqbal
(74) *Attorney, Agent, or Firm* — Slater Matsil, LLP (57) ABSTRACT

A vehicle includes a memory configured to store predetermined points in time at which each of a plurality of tasks is to be performed, the plurality of tasks including a first task and a second task, and a detector configured to determine a malfunction of at least one processor of a plurality of processors performing the plurality of tasks, wherein the detector is configured to control the at least one processor to output trigger signals for the first task and the second task based on whether one of the first and second tasks is completed at its respective predetermined point in time.

20 Claims, 8 Drawing Sheets

VEHICLE AND CONTROL METHOD THEREOF

CROSS-REFERENCE TO RELATED APPLICATIONS

This application claims priority to Korean Patent Application No. 10-2019-0146616, filed in the Korean Intellectual Property Office on Nov. 15, 2019, which application is hereby incorporated herein by reference.

TECHNICAL FIELD

The present disclosure relates to a vehicle and a control method thereof.

BACKGROUND

An autonomous driving technology of a vehicle is a technology in which the vehicle detects the road condition and automatically drives without the driver controlling the brakes, the steering wheel and the accelerator pedal.

Autonomous driving technology is a key technology for smart car implementation for autonomous cars, and includes the rear-side warning system (BSD, detection of nearby vehicles during reversing), as well as the highway driving support system (HDA (a technology that automatically maintains the distance between cars) warning system), automatic emergency braking system (AEB), a braking system when the vehicle is not recognized, lane departure warning system (LDWS), lane keeping assistance system (LKAS), Advanced Smart Cruise Control (ASCC), which maintains the distance between cars at a set speed and constant speed drive, Congestion Zone Assistance System (TJA), Parking Collision-Avoidance Assist (PCA), etc.

However, in performing a task of autonomous driving operation, a plurality of tasks may be performed in a plurality of processors. When each task does not operate normally, a safe and robust alternative is required.

SUMMARY

Embodiments of the present disclosure relate to a vehicle and a control method thereof capable of performing autonomous driving.

In view of the above, an embodiment of the present disclosure provides a vehicle and a control method thereof capable of performing a safe substitute operation despite an error in performing a time series task of an autonomous vehicle.

In accordance with an embodiment of the present disclosure, a vehicle includes a memory configured to store a predetermined time point (i.e., point in time) at which each of a plurality of tasks is performed, and a detector configured to determine malfunction of at least one processor performing the plurality of tasks, wherein the detector may control the at least one processor to output trigger signals for the task and another task based on whether one of the plurality of tasks is completed at the predetermined time point.

Further, the detector may control the at least one processor to output the trigger signal for another task when the one task is not completed at the predetermined time point corresponding to one task among the plurality of tasks.

Further, the plurality of tasks may include a peripheral task performed continuously with the one task, wherein the detector may control the at least one processor to perform the peripheral task based on completion data of the one task completed at the previous time point when the one task is not completed at the predetermined time point.

Further, the plurality of tasks may operate at a predetermined period, and the detector may control the at least one processor to perform the peripheral task based on completion data of the one task completed at the previous period time point when the one task is not completed at the predetermined time point.

Further, the plurality of tasks may include a start-up task operating at the predetermined period.

Further, the plurality of tasks may be performed in parallel in the at least one processor.

In accordance with an embodiment of the present disclosure, a method for controlling a vehicle includes storing a predetermined time point at which each of a plurality of tasks is performed, determining malfunction of at least one processor performing the plurality of tasks, and outputting trigger signals for the task and another task based on whether one of the plurality of tasks is completed at the predetermined time point.

Further, the method may include outputting the trigger signal for another task when the one task is not completed at the predetermined time point corresponding to one task among the plurality of tasks.

Further, the plurality of tasks may include a peripheral task performed continuously with the one task, wherein the method includes performing the peripheral task based on completion data of the one task completed at the previous time point when the one task is not completed at the predetermined time point.

Further, the plurality of tasks may operate at a predetermined period, and the method may include performing the peripheral task based on completion data of the one task completed at the previous period time point when the one task is not completed at the predetermined time point.

Further, the plurality of tasks may include a start-up task operating at the predetermined period.

Further, the plurality of tasks may be performed in parallel in the at least one processor.

BRIEF DESCRIPTION OF THE DRAWINGS

These and/or other aspects of the invention will become apparent and more readily appreciated from the following description of the embodiments, taken in conjunction with the accompanying drawings, in which.

DETAILED DESCRIPTION OF ILLUSTRATIVE EMBODIMENTS

In the following description, like reference numerals refer to like elements throughout the specification. This specification does not describe all elements of the embodiments, and in the technical field to which the present invention pertains, there is no overlap between the general contents or the embodiments. Terms such as "unit", "module", "member", and "block" may be embodied as hardware or software. According to embodiments, a plurality of "unit", "module", "member", and "block" may be implemented as a single component, or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the specification, when a member is located "on" another member, this includes not only when one member is in contact with another member but also when another member exists between the two members.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

Figure 1:
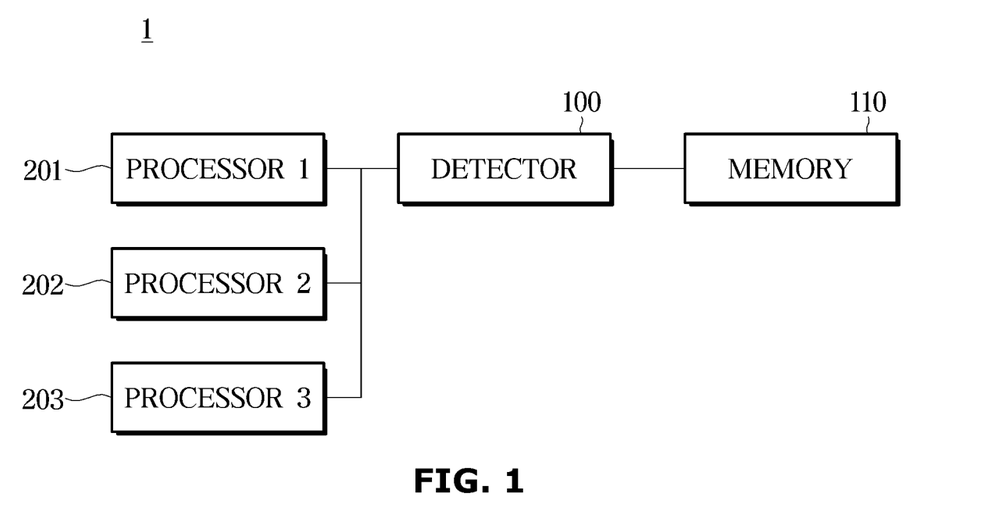
FIG. 1 is a control block diagram according to an embodiment.

FIG. 1 is a control block diagram according to an embodiment.

Referring to FIG. 1, a vehicle 1 according to an embodiment may include a memory 110 and a detector 100. The memory 110 may store a predetermined time point (i.e., point in time) at which each of the plurality of tasks is performed.

The task may mean an operation required for autonomous driving performed by the processors 201, 202, and 203 of the vehicle.

Meanwhile, the processors shown in FIG. 1 are an exemplary embodiment for describing the operation of the present embodiment and are not limited to the number or operation of the processors.

The predetermined time point may mean a point in time at which each task is completed in each processor.

The memory 110 may be a nonvolatile memory device such as a cache, a read only memory (ROM), a programmable ROM (PROM), an erasable programmable ROM (EPROM), an electrically erasable programmable ROM (EEPROM), and a flash memory, or a volatile memory device such as random access memory (RAM), or a storage medium such as a hard disk drive (HDD) or a CD-ROM, but it is not limited to this. The storage may be a memory implemented as a chip separate from the processor described above with respect to the controller, or may be implemented as a single chip with the processor.

The detector 100 may determine malfunction of at least one processor performing a plurality of tasks.

The detector 100 may control the at least one processor to output a trigger signal of one task and another task based on whether one task among the plurality of tasks is completed.

The trigger signal may mean a signal for inducing the start of performing each task.

The detector 100 may control at least one processor to output a trigger signal of one task and another task based on whether one task is completed at a predetermined time point corresponding to one task among the plurality of tasks.

In detail, the detector 100 controls the at least one processor to transmit a trigger signal that can command the start of the execution of another task to the processor performing the other task when one task is not completed at the predetermined time point.

The plurality of tasks may include one task and peripheral tasks that are continuously performed. The peripheral task may refer to a task that continuously performs one task and an operation of the task.

The detector 100 may control at least one processor to perform the peripheral task based on the completion data of the one task completed at a previous time point when the one task is not completed at a predetermined time point.

The plurality of task operates at a predetermined period, and the detector 100 controls the at least one processor to perform the peripheral task based on completion data of the one task completed at the previous period time point when the one task is not completed at the predetermined time point.

In more detail, in the operation of each task, the completion data of the previous task may be required. However, if the previous task is not completed, but the task is performed based on the trigger signal transmission, receiving the completion data of the previous task may be performed based on the completion data of the previous time, not the completion data of the corresponding time.

However, the task may operate with periodicity, and the processor may perform the task based on the completion data of the task corresponding to the previous period.

The plurality of tasks may include start-up tasks that operate at a predetermined period. The start-up task may refer to a task that operates based on a period independently of other related tasks.

Multiple tasks may be performed in parallel on multiple processors. What is done in parallel means that the task is conceptually done by a different route, not the temporal or associative limits of each task.

The detector 100 may be implemented as a memory for storing data about an algorithm or a program for implementing an algorithm for controlling the operation of components in the vehicle, and a processor for performing the above-described operations using the data stored in the memory 110. In this case, the memory 110 and the processor may be implemented as separate chips. Alternatively, the memory 110 and the processor may be implemented in a single chip.

At least one component may be added or deleted to correspond to the performance of the components of the vehicle illustrated in FIG. 1. In addition, it will be readily understood by those skilled in the art that the mutual position of the components may be changed corresponding to the performance or structure of the system.

Meanwhile, each component illustrated in FIG. 1 refers to a hardware component such as software and/or a field programmable gate array (FPGA) and an application specific integrated circuit (ASIC).

Figure 2:
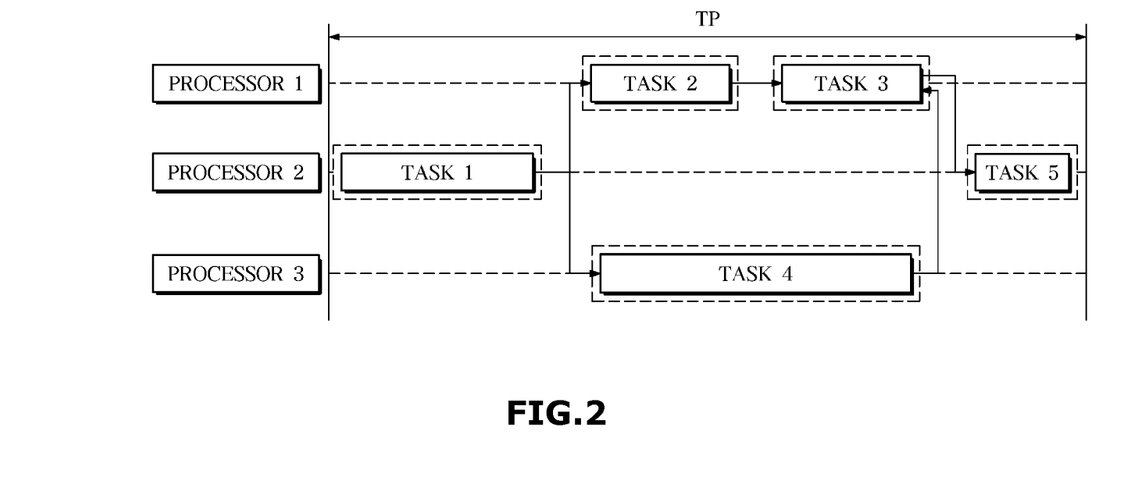
FIG. 2 is a diagram illustrating a plurality of tasks according to an exemplary embodiment.

FIG. 2 is a diagram illustrating a plurality of tasks according to an exemplary embodiment.

FIG. 2 shows that a plurality of tasks is performed in three processors.

In FIG. 2, a micro controller unit (MCU) includes three processors, and performs tasks 1 to 5 in the processors.

Each task may correspond to a processor having a different function.

A plurality of tasks may be performed sequentially or in parallel in each processor according to scheduling.

In FIG. 2, tasks 1 to 5 are performed in three processors. Task1 is performed in processor 2. Also, the chart indicates that task 2 and task 3 are performed by processor 1. Meanwhile, task 4 is performed in processor 3, and task 5 is performed in processor 2.

Task 1 is a start-up task that can perform its operations periodically. FIG. 2 shows that the processors 1 to 3 perform the operation of the tasks within the period TP.

When task 1 is completed, processor 2 may transmit a trigger signal for performing task 2 to processor 1. In addition, when task 1 is completed, processor 2 may transmit a trigger signal for starting task 4 to processor 3.

Processor 1 may perform task 3 when task 2 is completed.

Processor 3 may perform task 4. Meanwhile, when task 3 is completed in processor 1 and task 4 is completed in processor 3, processor 1 may transmit a trigger signal for performing task 5.

Alternatively, this operation can be performed in a manner where each task receives the completion data of the prior task before performing the next task. In one example, the tasks are performed sequentially from task 1 to task 5.

The detector 100 is a system having a multi-task execution scheduling structure. The detector 100 detects a malfunction in an individual software operation due to an error or an execution time delay.

On the other hand, the task described in the present specification is only an embodiment for explaining the operation of the present embodiment and is not limited to such a task.

FIGS. 3 to 7 are diagrams for describing an operation of detecting a malfunction of each task according to the embodiment.

In FIGS. 3 to 7, each task may store predetermined time points T1, T2, T3, T4, and T5, which are predicted completion times, in the memory 110.

The completion data of the task is updated only when the execution is completed, and when the execution is not completed, the data of the previous period of the task may be transmitted to the surrounding tasks.

Figure 3:
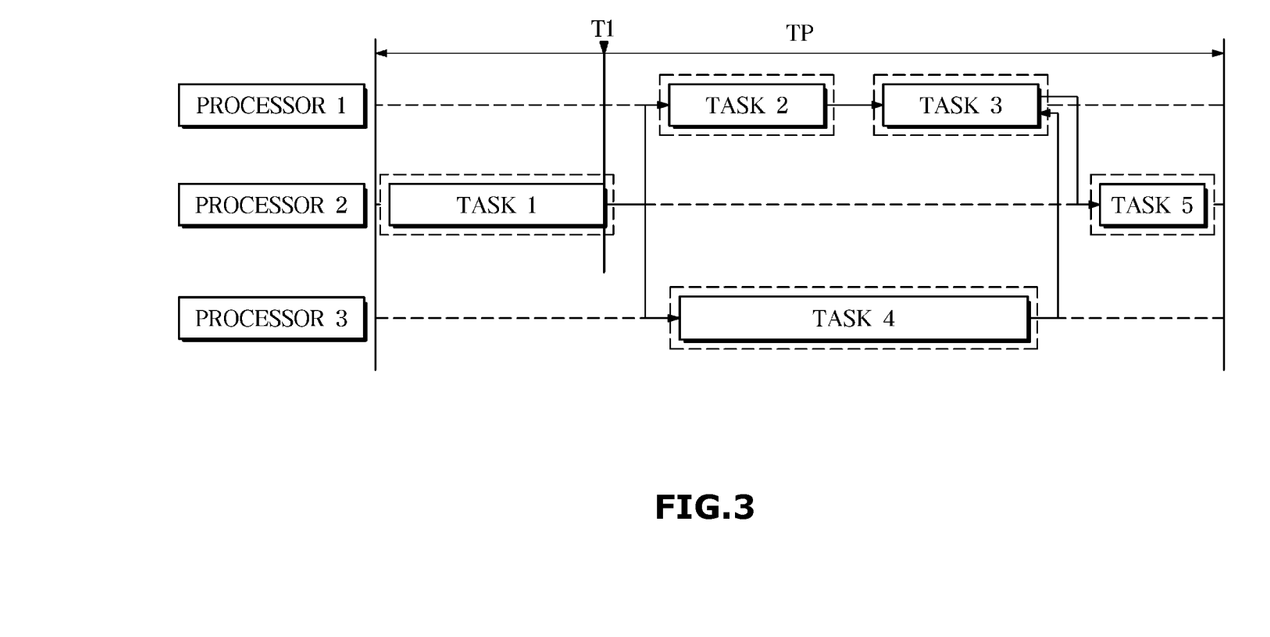
FIGS. 3 to 7 are diagrams for describing an operation of detecting a malfunction of each task according to embodiments.

Referring to FIG. 3, task 1 is not completed at a predetermined time point T1 corresponding to task 1.

In this case, the detector 100 may control the processor 2 to transmit a trigger signal to the processor 1 and the processor 3 to start the operation of task 2 and task 4.

Detector 100 can also pass task's previous period completion data to task 2 and task 4, allowing task 5 to output a control signal.

Figure 4:
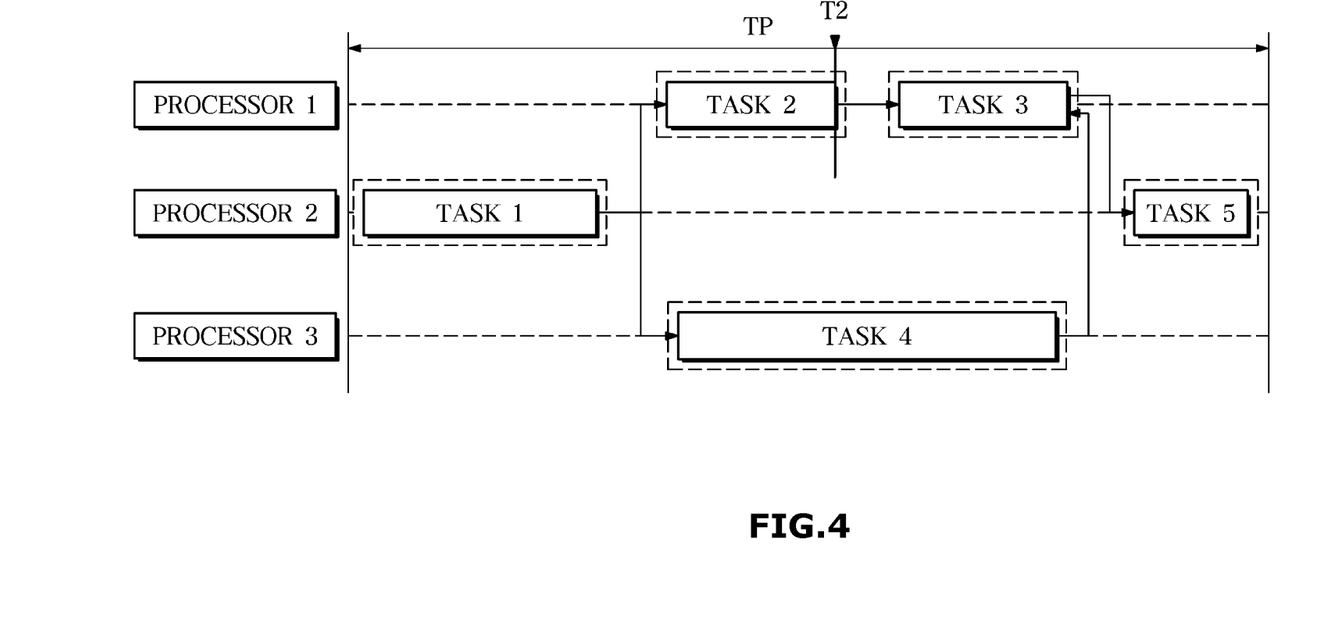

Referring to FIG. 4, task 2 is not completed at a predetermined time point T2 corresponding to task 2.

In this case, the detector 100 can control the processor 1 to transmit a trigger signal that can initiate the operation of task 3.

The detector 100 may transmit the current completion data value of task 1 and the previous period completion data of task 2 to task 3 to control task 5 to output a control signal.

Figure 5:
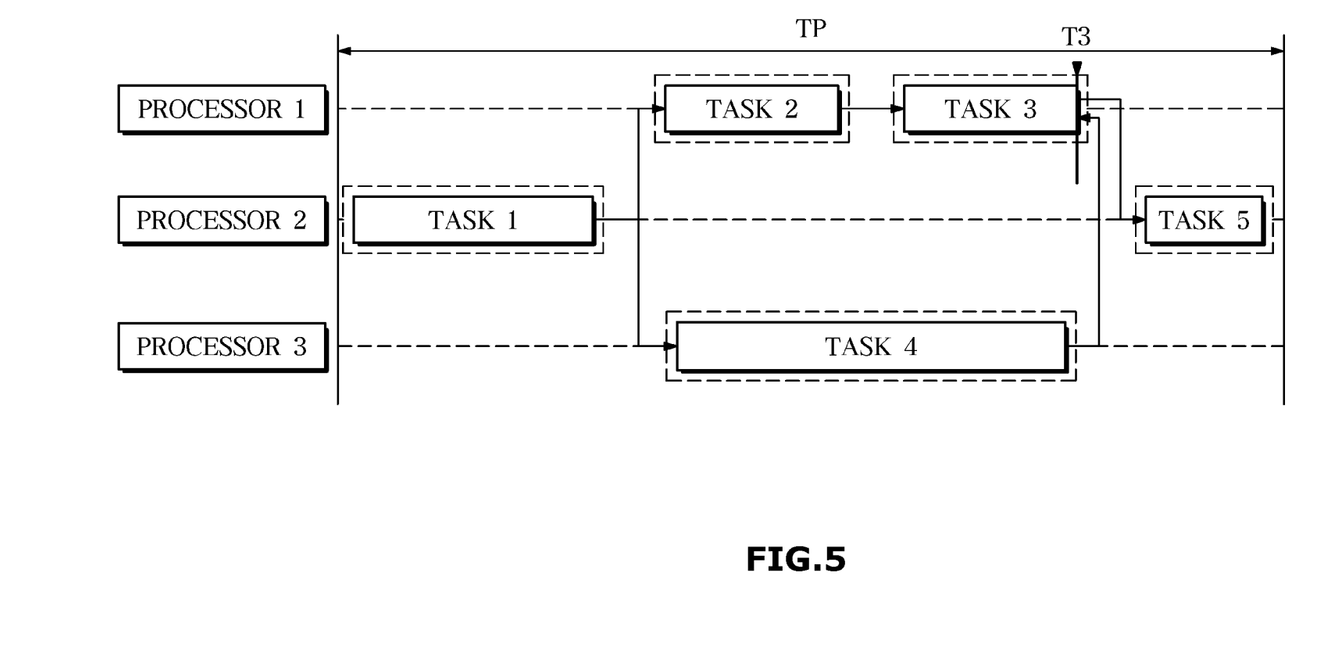

FIG. 5 illustrates a case in which task 3 is not completed at a predetermined time point T3 corresponding to task 3.

When task 3 is not completed at a predetermined time point corresponding to task 3, detector 100 may control processor 2 to transmit a trigger signal to task 5.

The processor may transmit the current period completion data of tasks 1, 2, and 4 and the previous period completion data of task 3 to task 5 to output a control signal.

Figure 6:
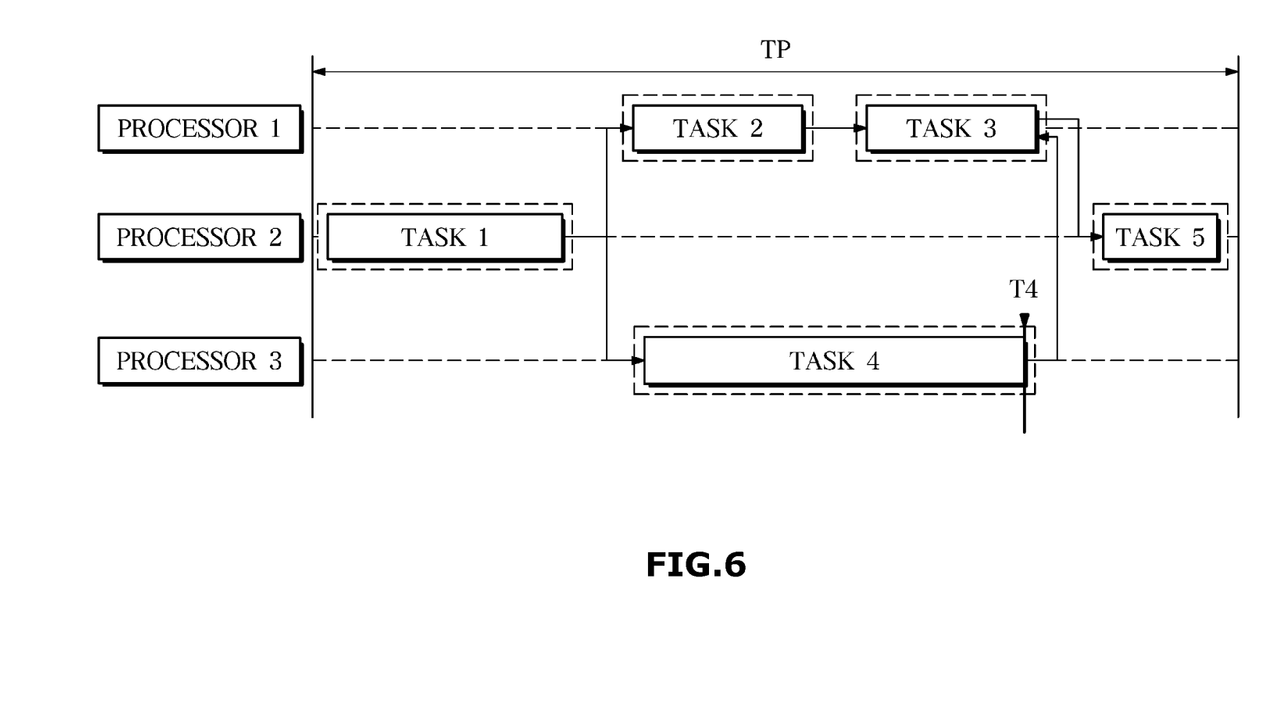

FIG. 6 illustrates a case in which task 4 is not completed at a predetermined time point T4 corresponding to task 4.

When the operation of task 4 is not completed at the predetermined time point corresponding to task 4, the detector 100 may control the processor 1 or the processor 3 to transmit a trigger signal for performing task 5 to task 5.

The detector 100 may transmit the completion data of the current period of tasks 1, 2, and 3 and the completion data of the previous period of task 4 to task 5 to output a control signal.

Figure 7:
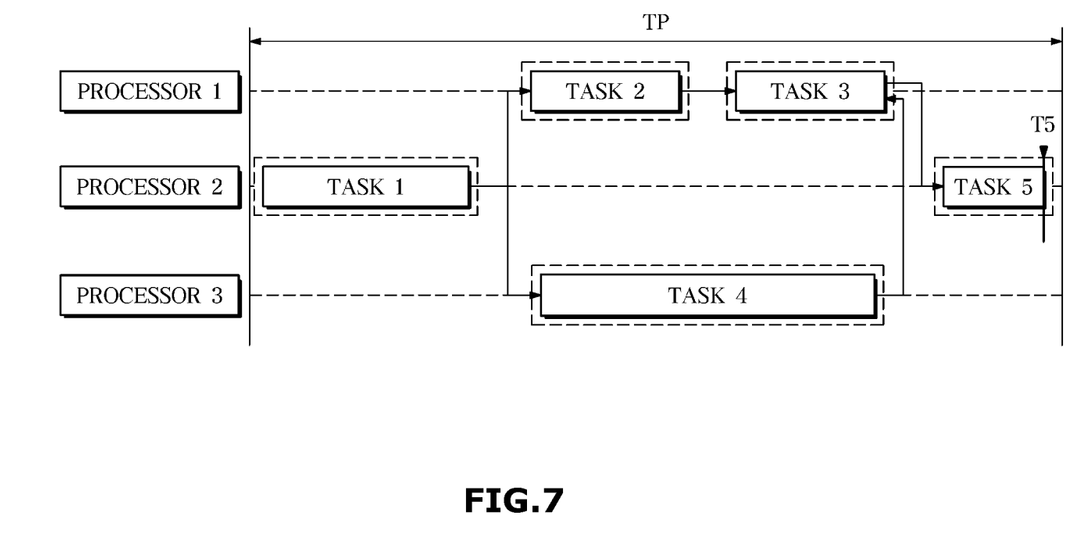

Referring to FIG. 7, the operation of task 5 is not completed at a predetermined time point T5 corresponding to task 5.

Referring to FIG. 7, when the operation of task 5 is not completed at a predetermined time point corresponding to task 5, detector 100 may control processor 1 or processor 3 to transmit a trigger signal to start performing task 5.

Task 5 may be controlled to transmit a trigger signal capable of starting task since task 5 required for subsequent operation does not exist and task 5 is a final task.

In this case, each processor may output a control signal based on previous period completion data of tasks 1, 2, 3, and 4.

However, in case of task 5, an operation with another processor and a module may be implemented based on the previous period output value of task 5.

Meanwhile, the operation described with reference to FIGS. 3 to 7 is only an embodiment for implementing the present disclosure, and there is no limitation in the operation type of the detector 100 for a time point corresponding to each task and a task not completed at the time point.

Figure 8:
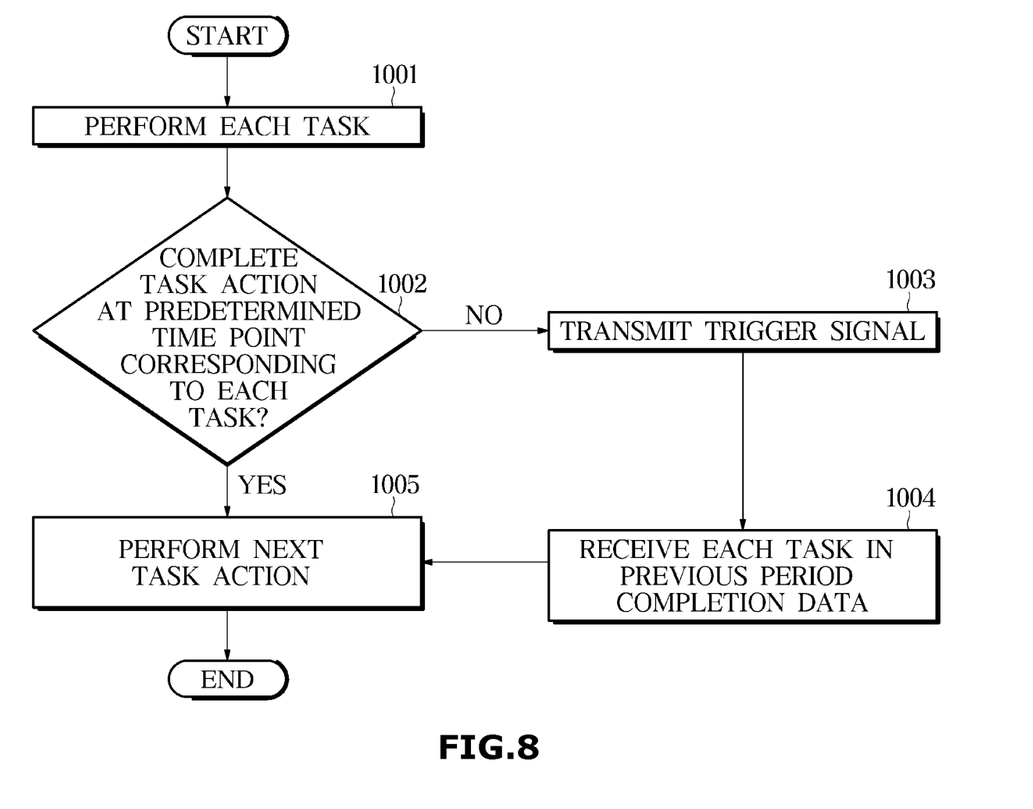
FIG. 8 is a flow chart according to an embodiment.

FIG. 8 is a flow chart according to an embodiment.

Referring to FIG. 8, each processor may perform each task (1001).

In this case, as described above, a predetermined time point corresponding to each task is stored in the memory 110, and the detector 100 may determine whether the operation of the task is completed at the corresponding time (1002). Completion of the task at that time means that the task is operating normally, so that each processor may perform another task (1005).

However, when the operation of the task is not completed at that time (NO at 1002), the detector 100 may transmit a trigger signal for starting the operation of another task to another task (1003). In addition, in this case, the associated task may receive the completion data of each task in the previous period (1004). Based on this, even if the operation of the task is not completed at the predetermined time point, the processor may perform the operation of the next task (1005).

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

The computer-readable recording medium includes all kinds of recording media in which instructions can be decoded by a computer. For example, there may be read only memory (ROM), random access memory (RAM), a magnetic tape, a magnetic disk, a flash memory, an optical data storage device, and the like.

As described above, the disclosed embodiments have been described with reference to the accompanying drawings. Although example embodiments of the disclosure have been shown and described, it would be appreciated by those skilled in the art that changes may be made to these embodiments without departing from the principles and spirit of the disclosure, the scope of which is defined in the claims and their equivalents.

The disclosed embodiments of the vehicle and controlling method thereof can perform a safe substitute operation despite an error in performing a time series task of an autonomous vehicle.

What is claimed is:

1. A vehicle comprising:
a memory configured to store a plurality of predetermined time points corresponding to times during which a plurality of tasks are to be performed; and
a detector configured to determine a malfunction of at least one processor of a plurality of processors performing each task of the plurality of tasks, wherein:
each task is an operation required for autonomous driving, and
when a first task among each task is not completed at a predetermined time point of the plurality of predetermined time points corresponding to the first task, the detector is further configured to transmit previous period completion data of the first task and current period completion data of a second task that has completed before the first task to a third task to be operated after the first task, wherein the previous period completion data of the first task comprises completion data produced by the first task during a prior complete execution of the first task.

2. The vehicle according to claim 1, wherein the detector is configured to control the at least one processor and initiate an operation of the third task by transmitting a trigger signal to the third task.

3. The vehicle according to claim 1, wherein:
when a final task among each task is not completed at a predetermined time point of the plurality of predetermined time points corresponding to the final task, the detector is configured to control the at least one processor and initiate the operation of the final task by transmitting a trigger signal to the final task.

4. The vehicle according to claim 1, wherein the plurality of tasks includes a start-up task operating at a predetermined time point of the plurality of predetermined time points corresponding to the start-up task.

5. The vehicle according to claim 1, wherein the plurality of tasks is configured to be performed in parallel in the at least one processor.

6. A method for controlling a vehicle, the method comprising:
storing a plurality of predetermined time points corresponding to times during which a plurality of tasks are to be performed;
determining a malfunction of at least one processor of a plurality of processors performing each task of the plurality of tasks, wherein each task is an operation required for autonomous driving; and
when a first task among each task is not completed at a predetermined time point of the plurality of predetermined time points corresponding to the first task, transmitting previous period completion data of the first task and current period completion data of a second task that has completed before the first task to a third task to be operated after the first task, wherein the previous period completion data of the first task comprises completion data produced by the first task during a prior complete execution of the first task.

7. The method according to claim 6, further including controlling the at least one processor and initiating the operation of the third task by transmitting a trigger signal to the third task.

8. The method according to claim 6, wherein the plurality of tasks include a startup task, and the method further comprises operating start-up task at a time point of the predetermined time points corresponding to the start-up task.

9. The method according to claim 6, further comprising, when a final task among each task is not completed at the predetermined time point of the plurality of predetermined time points corresponding to the final task, controlling the at least one processor and initiating the operation of the final task by transmitting a trigger signal to the final task.

10. The method according to claim 6, wherein the plurality of tasks is performed in parallel in the at least one processor.

11. A non-transitory computer readable medium with instructions stored thereon, wherein when the instructions are executed by a first processor, the first processor is enabled to perform the method of claim 6.

12. The non-transitory computer readable medium according to claim 11, wherein the plurality of tasks comprise at least one of a start-up task and a final task.

13. The non-transitory computer readable medium according to claim 11, the instructions, when executed by the first processor, further enable the first processor to perform the steps of:
controlling the at least one processor; and
initiating the operation of the third task by transmitting a trigger signal to the third task.

14. A system comprising:
the non-transitory computer readable medium of claim 11; and
the first processor coupled to the non-transitory computer readable medium.

15. The system according to claim 14, further comprising a memory coupled to the first processor for storing the plurality of predetermined time points.

16. A vehicle comprising the system of claim 15.

17. A device comprising:
a first processor; and
a memory coupled to the first processor, wherein instructions stored on the memory enable the first processor to perform the steps of:
storing a plurality of predetermined time points corresponding to times during which a plurality of tasks are to be performed;
determining a malfunction of at least one second processor of a plurality of second processors performing each task of the plurality of tasks, wherein each task is an operation required for autonomous driving; and
when a first task among each task is not completed at a predetermined time point of the plurality of predetermined time points corresponding to the first task, transmitting previous period completion data of the first task and current period completion data of a second task that has completed before the first task to a third task to be operated after the first task, wherein the previous period completion data of the first task comprises completion data produced by the first task during a prior complete execution of the first task.

18. The device according to claim 17, wherein the instructions stored on the memory enable the first processor to further perform the steps of:
controlling the at least one second processor; and
initiating the operation of the third task by transmitting a trigger signal to the third task.

19. The device according to claim 17, wherein:
the plurality of tasks include a startup task, and the instructions stored on the memory enable the first processor to further perform the step of operating start-up task at a time point of the predetermined time points corresponding to the start-up task.

20. The device according to claim 17, wherein the instructions stored on the memory enable the first processor to further perform the step of:

when a final task among each task is not completed at a predetermined time point of the plurality of predetermined time points corresponding to the final task, controlling the at least one second processor and initiating the operation of the final task by transmitting a trigger signal to the final task.

* * * * *